United States Patent
Xu et al.

(10) Patent No.: US 10,651,911 B2
(45) Date of Patent: May 12, 2020

(54) WIRELESS COMMUNICATION DEVICE AND WIRELESS COMMUNICATION METHOD

(71) Applicant: Sony Corporation, Tokyo (JP)

(72) Inventors: Jin Xu, Beijing (CN); Siqi Liu, Beijing (CN); Cheng Gao, Beijing (CN); Bingcheng Jin, Beijing (CN); Jinhui Chen, Beijing (CN)

(73) Assignee: SONY CORPORATION, Tokyo (JP)

( * ) Notice: Subject to any disclaimer, the term of this patent is extended or adjusted under 35 U.S.C. 154(b) by 93 days.

(21) Appl. No.: 15/770,664

(22) PCT Filed: Oct. 31, 2016

(86) PCT No.: PCT/CN2016/103994
§ 371 (c)(1),
(2) Date: Apr. 24, 2018

(87) PCT Pub. No.: WO2017/076250
PCT Pub. Date: Nov. 5, 2017

(65) Prior Publication Data
US 2018/0316404 A1    Nov. 1, 2018

(30) Foreign Application Priority Data
Nov. 6, 2015   (CN) .......................... 2015 1 0753149

(51) Int. Cl.
*H04W 4/00* (2018.01)
*H04B 7/06* (2006.01)
(Continued)

(52) U.S. Cl.
CPC ......... *H04B 7/0626* (2013.01); *H04L 5/0048* (2013.01); *H04W 16/28* (2013.01);
(Continued)

(58) Field of Classification Search
CPC .... H04B 7/0625; H04L 5/0048; H04W 16/28; H04W 24/02; H04W 24/10; H04W 72/085
See application file for complete search history.

(56) References Cited

U.S. PATENT DOCUMENTS

2010/0002800 A1* 1/2010 Kim ...................... H04L 5/0037
375/295
2011/0244877 A1* 10/2011 Farajidana ............ H04L 5/0023
455/452.2
(Continued)

FOREIGN PATENT DOCUMENTS

| CN | 101714897 A | 5/2010 |
| CN | 102448088 A | 5/2012 |

(Continued)

OTHER PUBLICATIONS

International Search Report dated Jan. 24, 2017 in PCT/CN2016/103994 filed Oct. 31, 2016.

*Primary Examiner* — Stephen M D Agosta
(74) *Attorney, Agent, or Firm* — Xsensus LLP

(57) ABSTRACT

A wireless communication device and a wireless communication method. A wireless communication device for use in a base station side includes one or more processors. The processor is configured to obtain a distribution state of a user equipment, and determine to use a channel state information-reference signal (CSI-RS) mechanism based on the distribution state of the user equipment. In addition, the processor is further configured to generate indication information, the indication information being used for indicating to the user equipment the CSI-RS to be used. Besides, the processor is further configured to control to send the CSI-RS to the user equipment according to the CSI-RS mechanism.

14 Claims, 10 Drawing Sheets

(51) Int. Cl.
*H04W 24/02* (2009.01)
*H04L 5/00* (2006.01)
*H04W 16/28* (2009.01)
*H04W 24/10* (2009.01)
*H04W 72/08* (2009.01)

(52) U.S. Cl.
CPC ........... *H04W 24/02* (2013.01); *H04W 24/10* (2013.01); *H04W 72/085* (2013.01)

(56) References Cited

U.S. PATENT DOCUMENTS

| | | | |
|---|---|---|---|
| 2012/0281567 A1* | 11/2012 | Gao | H04B 7/0626 370/252 |
| 2013/0064216 A1* | 3/2013 | Gao | H04L 5/0016 370/330 |
| 2013/0176978 A1* | 7/2013 | Abe | H04W 72/04 370/329 |
| 2013/0194931 A1* | 8/2013 | Lee | H04L 5/0053 370/241 |
| 2013/0242947 A1* | 9/2013 | Chen | H04W 72/04 370/335 |
| 2013/0272263 A1* | 10/2013 | Pi | H04W 72/042 370/330 |
| 2013/0301434 A1* | 11/2013 | Krishnamurthy | H04L 1/0026 370/252 |
| 2013/0301542 A1* | 11/2013 | Krishnamurthy | H04W 52/50 370/329 |
| 2013/0343299 A1* | 12/2013 | Sayana | H04B 7/0417 370/329 |
| 2014/0036796 A1* | 2/2014 | Etemad | H04W 76/10 370/329 |
| 2014/0044044 A1* | 2/2014 | Josiam | H04W 24/10 370/328 |
| 2014/0254418 A1 | 9/2014 | Chun et al. | |
| 2015/0237523 A1 | 8/2015 | Chun et al. | |
| 2016/0006539 A1* | 1/2016 | Nammi | H04L 1/0003 370/329 |

FOREIGN PATENT DOCUMENTS

CN 103891183 A 6/2014
CN 105991222 A 10/2016

\* cited by examiner

WIRELESS COMMUNICATION DEVICE AND WIRELESS COMMUNICATION METHOD

FIELD

The disclosure generally relates to the field of wireless communication, and in particular to wireless communication devices and wireless communication methods for base station side and user equipment side.

BACKGROUND

In Long Term Revolution (LTE) R10, the Channel Information Reference Signal CSI-RS is defined. Information that needs to be fed back by a UE, such as a precoding matrix index (PMI), a channel quality indication (CQI), and a rank indication (RI), can be calculated based on measurement of the CSI-RS. There are various CSI-RS mechanisms, such as the beamformed CSI-RS mechanism and the non-precoded CSI-RS mechanism.

SUMMARY

In the following, an overview of the embodiments of the present disclosure is given simply to provide basic understanding to some aspects of the present disclosure. However, it should be understood that this overview is not an exhaustive overview of the present disclosure. It is not intended to determine a critical part or an important part of the present disclosure, nor to limit the scope of the present disclosure. An object of the overview is only to give some concepts about the present disclosure in a simplified manner, which serves as a preface of a more detailed description described later.

According to an embodiment, a wireless communication device for base station side including at least one processor is provided. The processor is configured to acquire a distribution profile of user equipments, and determine, based on the distribution profile of the user equipments, a Channel State Information Reference Signal CSI-RS mechanism to be adopted. In addition, the processor is further configured to generate indication information for informing a user equipment of the CSI-RS mechanism to be adopted. Further, the processor is further configured to control, according to the CSI-RS mechanism, a transmission of a CSI-RS to the user equipment.

According to another embodiment, a wireless communication method for base station side is provided. The method includes a step of acquiring a distribution profile of user equipments, and determining, based on the distribution profile of the user equipments, a Channel State Information Reference Signal CSI-RS mechanism to be adopted. In addition, the method further includes a step of generating indication information for informing a user equipment of the CSI-RS mechanism to be adopted. Further, the method further includes a step of controlling, according to the CSI-RS mechanism, a transmission of a CSI-RS to the user equipment.

According to yet another embodiment, a wireless communication device for user equipment side including at least one processor is provided. The processor is configured to control a transmission of an uplink signal providing directional information to a base station, and parse indication information from the base station, where the indication information indicates a Channel State Information Reference Signal CSI-RS mechanism to be adopted. In addition, the processor is further configured to control a measurement of a CSI-RS from the base station according to the indicated CSI-RS mechanism.

According to still another embodiment, a wireless communication method for user equipment side is provided. The method includes a step of controlling a transmission of an uplink signal providing directional information to a base station. The method further includes a step of parsing indication information from the base station, where the indication information indicates a Channel State Information Reference Signal CSI-RS mechanism to be adopted. In addition, the method further includes a step of controlling a measurement of a CSI-RS from the base station according to the indicated CSI-RS mechanism.

According to the embodiments of the present disclosure, a suitable CSI-RS mechanism is selected based on the distribution profile of user equipments, thus a better CSI-RS performance can be provided.

BRIEF DESCRIPTION OF THE DRAWINGS

The present disclosure can be better understood by referring to the following description in conjunction with the accompanying drawings. Same or similar reference characters indicate same or similar parts throughout the accompanying drawings. The accompanying drawings are included in the description together with the following specifications as a part of the description for further illustrating preferred embodiments with examples and explaining the principle and advantages of the present disclosure. In the accompanying drawings.

DETAILED DESCRIPTION OF THE EMBODIMENTS

Embodiments of the present disclosure will be described below with reference to the companying drawings. Elements and features described in a companying drawing or an embodiment may be combined with elements and features illustrated in one or more other companying drawings or embodiments in the present disclosure. It should be noted that presentation and explanation of irrelevant components and processes known by those skilled in the art are omitted in the companying drawings and the description for clarity.

Figure 1:
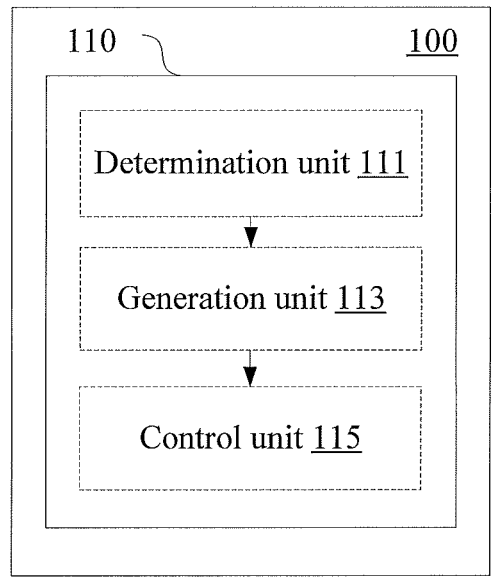
FIG. 1 is a block diagram illustrating a configuration example of a wireless communication device for base station side according to an embodiment of the present disclosure.

As shown in FIG. 1, the wireless communication device 100 according to an embodiment includes a processor 110. The processor 110 includes a determination unit 111, a generation unit 113 and a control unit 115. It is to be noted that, although the determination unit 111, the generation unit 113 and the control unit 115 are shown in the drawings as functional modules, it should be understood that functions of the determination unit 111, the generation unit 113 and the control unit 115 may be implemented by the processor 110 as a whole, and are not necessarily implemented by discrete actual components in the processor 110. In addition, although the processor 110 is shown by one block in FIG. 1, the communication device 100 may include multiple processors, and functions of the determination unit 111, the generation unit 113 and the control unit 115 may be distributed to the multiple processors, which cooperate to implement these functions.

The determination unit is configured to acquire a distribution profile of user equipments, and determine a Channel State Information Reference Signal (CSI-RS) mechanism to be adopted based on the distribution profile of the user equipments. For example, the distribution profile of the user equipments may be acquired by estimating the distribution profile of the user equipments based on directional information acquired from uplink signals of the user equipments. For example, the uplink signal may include a sounding reference signal (SRS), and the directional information may include an angle of arrival (AOA) of the SRS.

In an actual scenario, the beamformed CSI-RS mechanism and the non-precoded CSI-RS mechanism do not conflict with each other, and may coexist. Therefore, according to an embodiment, the CSI-RS mechanism may be determined by selecting at least one of the beamformed CSI-RS and the non-precoded CSI-RS.

Specifically, according to an embodiment, the determination unit 111 may be configured to select a CSI-RS mechanism suitable for the distribution profile of the user equipments based on the distribution profile.

The distribution profile may be used for indicating the user density, and may be determined in various manners.

For example, according to an embodiment, the distribution density of user equipments may be determined based on sounding reference signals (SRSs) from the user equipments. The SRS may be periodically transmitted by the user equipment. SRS is mainly used to perform uplink channel quality measurement for frequency selective scheduling, and the measurement result of the SRS may be used for downlink beam forming. One can refer to the content of 36.211-5.5.3 of the 3GPP protocol related to the sounding reference signal for specific parameters and configurations of the SRS.

According to the embodiment of the present disclosure, the manner of determining the CSI-RS mechanism based on the distribution profile of the user equipments may include determining which CSI-RS mechanism to adopt based on whether the user equipments are sparsely or densely distributed in a region. Whether the user equipments are sparsely or densely distributed in a region may be determined based on whether the density of the user equipments in the region is greater than a predetermined threshold. In a region where the user equipments are densely distributed (for example, the density of the user equipments in the region is greater than a predetermined threshold), interferences among beams may be increased and the performance may be reduced if the beamformed CSI-RS mechanism is adopted, since the number of beams in the region is too much.

Correspondingly, according to an embodiment, the determination unit 11 is configured to select the non-precoded CSI-RS in a case where the user density is higher than a predetermined level, and select the beamformed CSI-RS in a case where the user density is lower than the predetermined level.

As described above, an object of this embodiment is to avoid interferences between beams. Therefore, in this embodiment, the predetermined level for the user density is associated with the spatial resolution of the beamformed CSI-RS. For example, the predetermined level for the user density may correspond to an acceptable level of interferences among beams in a case where the beamformed CSI-RS is adopted.

In addition, the region in which the user density is measured may include an entire cell, and the CSI-RS mechanism may be determined for the entire cell. Alternatively, according to an embodiment, the CSI-RS may be selected for each of sub-regions of the cell served by the base station based on the distribution profile of the user equipments in the sub-region.

Specifically, the cell may be partitioned into N partitions, where the value of N may change over time, and may be selected by the base station according to specific conditions. For example, the cell may be partitioned into three sectors. In addition, the partitioning is not limited to horizontal partitioning, and vertical partitioning may also be performed. In a case where a precise result is required, N with a greater value may be selected, which corresponds to a partition scheme having a high resolution. The size of the sector may also be associated with the coverage of a single beam.

For each of the sectors, the number of user equipments (in units of piece) in the sector may be calculated, and the user density of the sector (in units of pieces/sector) is calculated and the calculated user density is compared with a predetermined threshold T (for example, in unit of pieces/sector). The value of T may be determined based on results of an actual system experiment. The value of T varies with the value of N, which is the number of sectors of the cell. For each sector, it is determined that the user equipments are densely distributed in the sector, and the non-precoded CSI-RS may be adopted, in a case where the user density is greater than T. Otherwise, it is determined that the user equipments are sparsely distributed in the sector, and the beamformed CSI-RS may be adopted.

In addition, the following exemplary manner may be considered.

T is set as a range. It is determined that the user equipments are densely distributed in the target region in a case where the user density of the region falls within the range T, it is determined that the user equipments are sparsely distributed in the region in a case where the user density is less than the lower limit of the range T, and it may be determined that the partitioning is not fine enough in a case where the user density is greater than the upper limit of the range T, in which case the value of N may be increased, and the user density is compared with the threshold (or threshold range) corresponding to the increased N. The value of N may be increased in a progressive manner or a stepwise manner.

Figure 12:
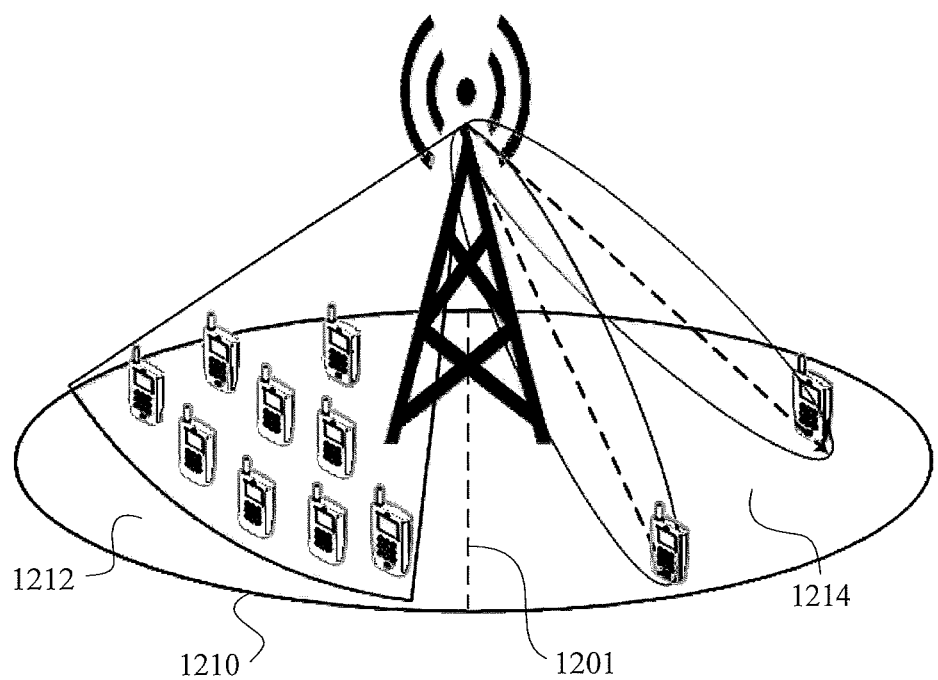
FIG. 12 is a schematic diagram for illustrating the distribution profile of user equipments and the CSI-RS mechanism.

FIG. 12 illustrates an example of a distribution profile of user equipments in a cell. In the example, a cell 1210 is partitioned into two sub-regions 1212 and 1214, between which a boundary is shown by a dotted line 1201. As shown in FIG. 12, distribution profiles of user equipments in different sub-regions in the cell 1210 are different, where user equipments are sparsely distributed in one region, and user equipments are densely distributed in the other region. Since the beamformed CSI-RS mechanism and the non-precoded CSI-RS mechanism can coexist in one cell, where the former is suitable for user equipments in sparse distribution, and the latter is suitable for user equipments in dense distribution. Therefore, for example, the non-precoded CSI-RS mechanism may be adopted by the user equipments in the sub-region 1212, and the beamformed CSI-RS mechanism may be adopted by the user equipments in the sub-region 1214.

In addition, the distribution profile of user equipments usually varies over time. Correspondingly, the suitable CSI-RS mechanism may also varies with the distribution profile of user equipments. Therefore, it may be necessary to switch between different CSI-RS mechanisms.

Reference is still made to FIG. 1. The generation unit 113 is configured to generate indication information for informing a user equipment of the CSI-RS mechanism to be adopted. For example, as described in detail below in conjunction with specific examples, the indication information may be embedded in a Radio Resource Control (RRC) signaling.

In addition, the control unit 115 is configured to control a transmission of a CSI-RS to the user equipment according to the CSI-RS mechanism to be adopted. Thus the user equipment can generate a Channel State Information (CSI) report based on the CSI-RS.

In addition, according to an embodiment, the control unit 115 may be further configured to control a reception and/or parsing of the Channel State Information CSI report from the user equipment.

The format of the CSI report may vary depending on different CSI-RS mechanisms. Specifically, the format of the CSI report in the existing standards may be used for the non-precoded CSI-RS mechanism. However, no CSI report format for the beamformed CSI-RS mechanism is defined in the existing standards.

According to an embodiment, the control unit 115 is configured such that, for the beamformed CSI-RS, the received/parsed CSI report may include only the channel quality indication (CQI), and for the non-precoded CSI-RS, the CSI report may contain the CQI, the rank indication (RI) and the precoding matrix indication (PMI).

Next, an example of the device at base station side according to an embodiment of the present disclosure informing the user equipment of the determined CSI-RS mechanism and processing the corresponding CSI report is described with a specific example. It should be understood that, the present disclosure is not limited to specific details in the following example.

In order that the CSI report is fed back in a correct format, in a case where the CSI-RS mechanism to be adopted is changed, the base station may inform the user equipment of the CSI-RS mechanism which is currently adopted by, for example, modifying the IE physicalConfigDedicated signaling. A parameter of 1 bit, which is named as CSI-RS-MODE, for example, is embedded in the signaling, for informing the user equipment which CSI-RS mechanism is currently adopted, and which CSI report format is to be adopted by the user equipment correspondingly.

Specifically, the following exemplary configuration may be adopted:

CSI-RS-MODE is 1, which indicates the user equipment to use the beamformed CSI-RS mechanism, and feed back the CSI report in the format for the beamformed CSI-RS;

CSI-RS-MODE is 0, which indicates the user equipment to use the non-precoded CSI-RS mechanism, and feed back the CSI report in the format for the non-precoded CSI-RS.

In addition, in order to enable the user equipment to feed back the CSI report having correct content and in the correct format, IE CQI-ReportConfig may be modified. For example, CQI-ReportConfig-r13 may be defined, and a portion corresponding to CQI-ReportConfig in IE PhysicalConfigDedicated may be modified, such that PhysicalConfigDedicated-r13 contains, in addition to defined parameters, a newly defined parameter such as CSI-RS-MODE and CQI-ReportConfig-r13.

An exemplary modification of PhysicalConfigDedicated-r13 is as follows:

```
PhysicalConfigDedicated-r13 ::=
SEQUENCE
{
    CSI-RS-MODE            ENUMERATED {0,1},
    cqi-ReportConfig-r13   CQI-ReportConfig-r13
    OPTIONAL,      --Need ON
}
```

In addition, regarding the specific manner in which the format of the CSI report is informed to the user equipment, in the existing standards, the user equipment may feed back only the COI, or feed back the PMI, the RI and the CQI simultaneously, according to different nees. The content of the feedback is controlled through IE CQI-ReportConfig in the RRC.

In the existing RRC resource configuration procedure, in a case where the parameter domain pmi-RI-Report of IE CQI-ReportConfig does not exist, the user equipment feeds back only the CQI. Whether pmi-RI-Report is present is determined according to a presence condition PMIRI.

Therefore, in order that the user equipment reports only the CQI when using the beamformed CSI-RS mechanism (for example, CSI-RS-MODE=1), the parameter domain pmi-RI-Report is not configured (PMIRI is absent). In order that the user equipment feeds back the PMI, the RI and the CQI when using the non-precoded CSI-RS mechanism (for example, CSI-RS-MODE=0), the parameter domain pmi-RI-Report is configured (PMIRI is present). Therefore, IE CQI-ReportConfig, the parameter domain pmi-RI-Report thereor and the presence condition PMIRI thereof may be redefined, to support the switching and coexistence of CSI report formats for the beamformed CSI-RS mechanism and the non-precoded CSI-RS mechanism. For example, CQI-ReportConfig-r13, the modified pmi-RI-Report and PMIRI may be defined as:

```
CQI-ReportConfig-r13 ::=
SEQUENCE
{
  pmi-RI-Report-r13 ENUMERATED {setup}
  OPTIONAL           -- Cond PMIRI
}
```

Further, descriptions of pmi-RI-Report and PMIRI in the CQI-ReportConfig domain are also modified. The following content is added to the description of pmi-RI-Report in the CQI-ReportConfig domain:

The UE shall ignore pmi-RI-Report-r9/pmi-RI-Report-r10/pmi-RI-Report-r11 when pmi-RI-Report-r13 is configured for the serving cell on this carrier frequency.

The following content is added to the description of PMIRI in the CQI-ReportConfig domain:

If CST-RS-MODE is set to 1, this field is not present, and if CSI-RS-MODE is set to 0, this field is present.

In the above, the wireless communication device for base station side according to an embodiment of the present disclosure is described in conjunction with specific examples. With the above embodiment, switch between, for example, the non-precoded CSI-RS mechanism and the beamformed CSI-RS mechanism may be implemented.

The non-precoded CSI-RS provides a broad beam which covers an entire cell, and the beamformed CSI-RS provides a directional narrow beam. Since the beamformed CSI-RS is directional, the user equipment may acquire a greater gain using the beamformed CSI-RS as compared with using the non-precoded CSI-RS, so the user equipment may be provided with a better service with the beamformed CSI-RS. Of course, when a distance between beams directed to different user equipments is too small, interferences between beams is greater, in which case the non-precoded CSI-RS is more suitable. Therefore, the beamformed CSI-RS is suitable in a case where user equipments are sparsely distributed, and the non-precoded CSI-RS is suitable in a case where user equipments are densely distributed. Distribution profiles of user equipments in sub-regions in a cell are different, user equipments may be densely distributed in some of the sub-regions, and may be sparsely distributed in other sub-regions. The method according to the present is suitable for the above condition. As compared with the case where only one of the beamformed CSI-RS and the non-precoded CSI-RS is used, better performance can be achieved with the embodiments according to the embodiments of the present disclosure.

In addition, according to an embodiment of the present disclosure, corresponding CSI-RS resources may set for different CSI-RS mechanisms.

Figure 2:
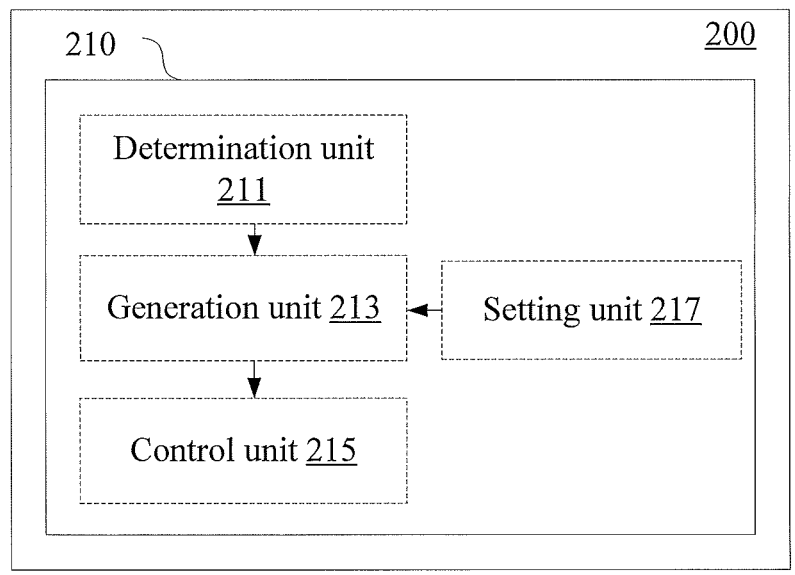
FIG. 2 is a block diagram illustrating a configuration example of a wireless communication device for base station side according to another embodiment.

As shown in FIG. 2, the wireless communication device 200 according to the embodiment include at least one processors 210, which includes a determination unit 211, a generation unit 213, a control unit 215 and a setting unit 217. The determination unit 211, the generation unit 213 and the control unit 215 are similar to the determination unit 111, the generation unit 113 and the control unit 115 described above with reference to FIG. 1, and are not described in detail herein.

The setting unit 217 is configured to set, for the beamformed CSI-RS and the non-precoded CSI-RS, corresponding CRI-RS resource sub-sets respectively.

According to an embodiment, the setting unit 217 setting the corresponding CRI-RS resource sub-sets may include respectively setting the numbers of ports of CSI-RS resource for the beamformed CSI-RS and the non-precoded CSI-RS based on the numbers of user equipments adopting the beamformed CSI-RS and the non-precoded CSI-RS. As commonly understood in the art, the port of the CSI-RS resource described herein corresponds to a time-frequency resource for the CSI-RS.

Correspondingly, the generation unit 213 may be configured to generate information for informing a user equipment of the number of ports for a corresponding CSI-RS mechanism.

In addition, according to an embodiment, the setting unit 217 is configured to set the CSI-RS resource subset corresponding to the beamformed CSI-RS and the CSI-RS resource subset corresponding to the non-precoded CSI-RS to be orthogonal to each other. With this configuration, overlap between the resource for the beamformed CSI-RS and the resource for the non-precoded CSI-RS can be avoided, an orthogonality is achieved, thereby eliminating interference between the non-precoded CSI-RS and the beamformed CSI-RS.

In a case where CSI-RS resources are allocated based on the number of ports, CRI-RS resource sub-sets which are orthogonal to each other may be respectively allocated to the beamformed CSI-RS and the non-precoded CSI-RS in the following manner.

A first group of ports starting from a minimum port number of CSI-RS resource is allocated to one of the beamformed CSI-RS and the non-precoded CSI-RS, and a second group of ports starting from a maximum port number of the CSI-RS resource is allocated to the other one of the beamformed CSI-RS and the non-precoded CSI-RS.

Correspondingly, in a case where the CSI-RS mechanism to be adopted corresponds to the above second group of ports, the generation unit 213 may be configured to generate a signaling for informing a user equipment to select a port starting from the maximum port number of the CSI-RS resource.

The setting 217 may set the CSI-RS resource sub-sets for different CSI-RS mechanisms according to the following exemplary allocation principle.

A balance factor "$\alpha$" ($0 \leq \alpha \leq 1$) is defined, the value of $\alpha$ is determined based on the distribution profile of the user equipments. For example, in a case where the user equipments for which the non-precoded CSI-RS is suitable form a greater proportion of the user equipments in the entire cell, $\alpha$ is set to a smaller value, i.e., more resource is allocated to the non-precoded CSI-RS, and less resource is allocated to the beamformed CSI-RS; and in a case where the user equipments for which the beamformed CSI-RS is suitable form a greater proportion of the user equipments in the entire cell, $\alpha$ is set to a greater value, i.e., more resource is allocated to the beamformed CSI-RS, and less resource is allocated to the non-precoded CSI-RS.

Then, the CSI-RS resource may be divided into two groups which include, for example, a first group and a second group based on the value of "$\alpha$". For example, the first group is allocated to the beamformed CSI-RS, and the second group is allocated to the non-precoded CSI-RS. The number of CSI-RS ports corresponding to the CSI-RS resource in the first group is denoted as Portcount1, and the number of CSI-RS ports corresponding to the CSI-RS resource in the second group is denoted as Portcount2. For example, assuming that the total number of CSI-RS ports is 8, then Portcount1=INT($\alpha$*8), Portcount2=INT((1−$\alpha$)*8), and Portcount1+Portcount2=N, where INT( ) represents rounding, and N is the total number of CSI-RS ports.

In addition, for example, it may be prescribed that in the case of the beamformed CSI-RS mechanism, the user equipment may parse Portcount1 ports in an ascending order from the CSI-RS port having the minimum ID according to the CSI-RS configuration in the existing standards, and in the case of the non-precoded CSI-RS mechanism, the user equipment needs to parse Portcount2 ports in a descending order from the CSI-RS port having the maximum ID. For example, assuming that there are 8 ports, and the CSI-RS port IDs are 15-22, so CSI-RS ports having the IDs of (15, 16, . . . , 15+Portcount1−1) are allocated to the first group corresponding to the beamformed CSI-RS mechanism, and CSI-RS ports having the IDs of (22, 21, . . . , 22−Portcount2+1) are allocated to the second group corresponding to the non-precoded CSI-RS mechanism. Therefore, when the user equipment parses the allocated ports and resource, in the case of the beamformed CSI-RS mechanism, the user equipment may parse Portcount1 ports in an ascending order from port 15 according to the CSI-RS configuration in the existing standards, and in the case of the non-precoded CSI-RS, the user equipment may parse Portcount2 ports in a descending order from port 22. Of course, the above allocation manners for the non-precoded CSI-RS mechanism and the beamformed CSI-RS mechanism are interchangeable.

In addition, in a case where the ports need to be selected starting from the maximum port number of the CSI-RS resource, a new signaling may be defined for informing the user equipment.

Specifically, the existing standards support the user equipment to parse the allocated CRI-RS resource and ports in an ascending order from the CSI-RS port having an ID of 15, and do not support the above resource allocation manner for the non-precoded CSI-RS where CSI-RS ports are parsed in a descending order from the CSI-RS port having an ID of 22, so the user equipment cannot correctly parse the allocated CRI-RS resource and ports. Therefore, a new signaling, which may be named as NP-portsindicator and may be 1 bit, for example, may be defined. For example, when the non-precoded CSI-RS mechanism is adopted, the base station may transmit NP-portsindicator (NP-portsindicator=1) to the user equipment, for indicating that the user equipment needs to parse Portcount2 ports in a descending order from port 22.

However, the manner in which the resource is grouped is not limited to the above. According to an embodiment, setting the corresponding CSI-RS resource sub-set may include allocating ports for a corresponding CSI-RS mechanism in one of multiple predetermined manners. In addition, indication information for informing the user equipment of the adopted predetermined manner may be generated. The predetermined manner for grouping the resource may include, for example, cross grouping, random grouping, and the like.

Next, an exemplary procedure of processing performed between the wireless communication device for base station side according to an embodiment of the present disclosure and the user equipment is briefly described.

First, the base station acquires a distribution profile of user equipments based on SRSs periodically transmitted by the user equipments. The base station may determine user densities in different regions in a cell based on the distribution profile of the user equipments, and compare the user density with a predetermined threshold T. It may be determined that the user equipments are densely distributed in a region if the user density is greater than T, otherwise, it may be determined that the user equipments are sparsely distributed. The base station may determine which CSI-RS mechanism is suitable for each of different regions in the cell based on the distribution profile of the user equipments. If the CSI-RS mechanism for a certain region is changed, the base station may inform the user equipments in the region of this change through, for example, an RRC signaling. Next, the base station can reconfigure corresponding CSI-RS resource to the user equipments. The user equipments can measure the allocated CSI-RS resource and feed back the CSI using a corresponding CSI report format.

Next, exemplary procedures of switching from the non-precoded CSI-RS mechanism to the beamformed CSI-RS mechanism and switching from the beamformed CSI-RS mechanism to the non-precoded CSI-RS mechanism are described with reference to FIG. 13 and FIG. 14, respectively.

Figure 13:
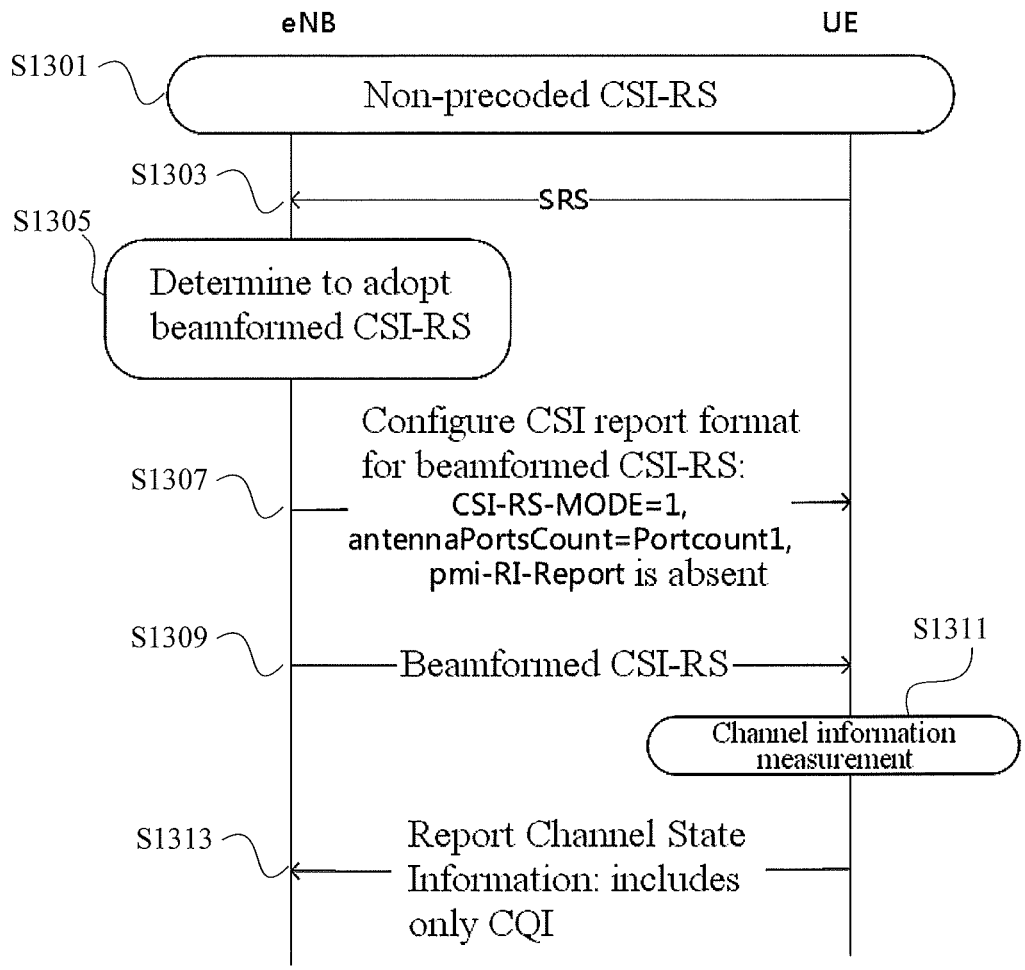
FIG. 13 is a schematic diagram for illustrating a procedure example of CSI-RS resource configuration and measurement feedback performed between a base station and a user equipment.

FIG. 13 illustrates an exemplary procedure of switching from the non-precoded CSI-RS to the beamformed CSI-RS.

In S1301, the base station and the user equipments currently adopt the non-precoded CSI-RS mechanism.

In S1303, the base station acquires a distribution profile of the user equipments based on SRSs periodically transmitted by the user equipments.

In S1305, it is assumed that the base station calculates the user density and determines that the user density is less than the threshold T, that is, distribution of user equipments is this region changes to be sparse. Therefore, the base station determines to switch to the beamformed CSI-RS mechanism.

Next, in S1307, the base station informs the user equipments of this change through, for example, an RRC signaling, and reconfigures corresponding CSI-RS resource for the user equipments.

The CST-RS resource, i.e., the number of ports currently allocated, may be informed to the user equipments through a parameter antennaPortsCount in existing IE AntennaInfo (see 3GPP TS36.311 6.3.2). In a case where the CSI-RS resource (ports) is divided in to two groups, which are respectively allocated to the beamformed CSI-RS and the non-precoded CSI-RS, the parameter antennaPortsCount in IE AntennaInfo may be modified to the corresponding ports number PortCount1 or PortCount2, for informing the user equipments of the number of ports allocated for the beamformed CSI-RS or the non-precoded CSI-RS.

In S1309, the base station transmits beamformed CSI-RSs to the user equipments.

In S1311, the user equipment parses and measures the allocated CSI-RS resource. In S1313, the user equipment feeds back the CSI in the CSI report format corresponding to the beamformed CSI-RS mechanism (for exampling, including only the CQI).

Figure 14:
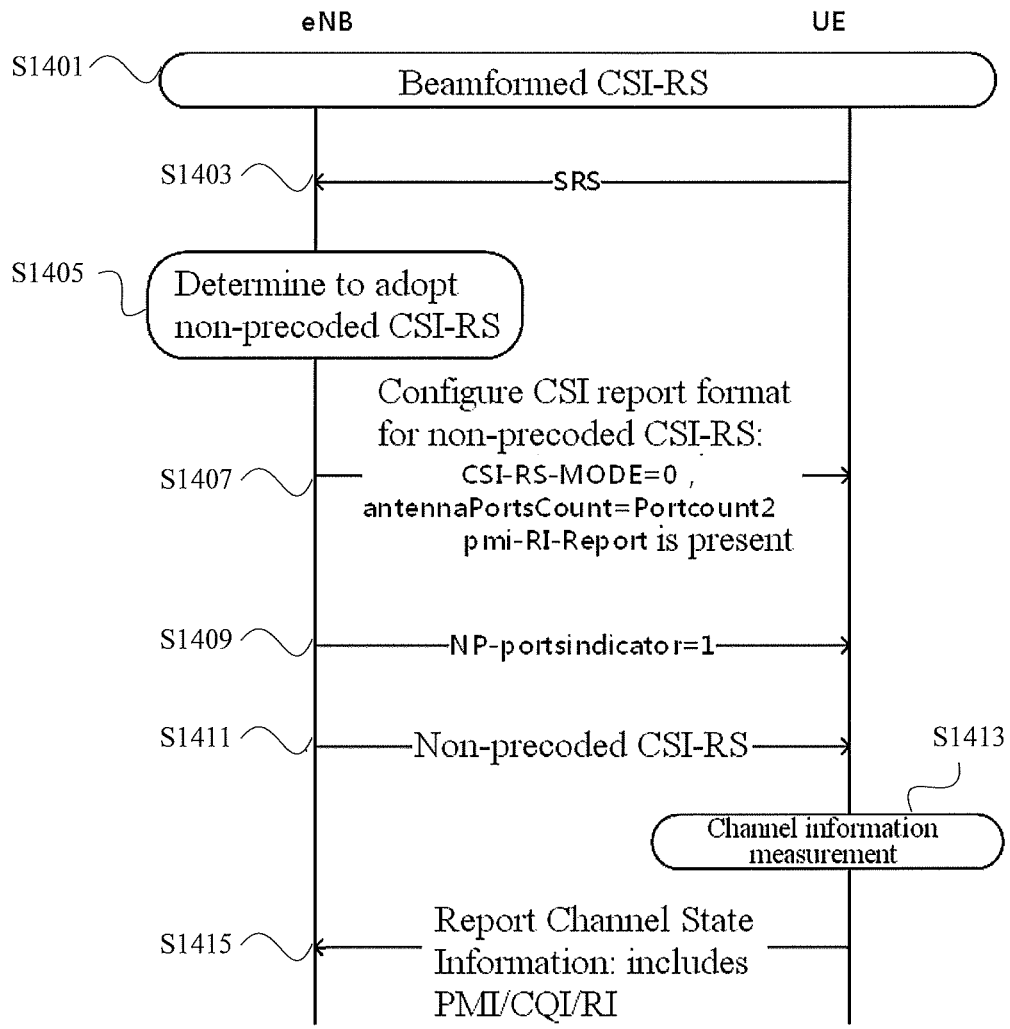
FIG. 14 is a schematic diagram for illustrating another procedure example of CSI-RS resource configuration and measurement feedback performed between a base station and a user equipment.

FIG. 14 illustrates an exemplary procedure of switching from the beamformed CSI-RS to the non-precoded CSI-RS.

In S1401, the base station and the user equipments currently adopt the beamformed CSI-RS mechanism.

In S1403, the base station acquires a distribution profile of the user equipments based on SRSs periodically transmitted by the user equipments.

In S1405, it is assumed that the base station calculates the user density and determines the user density is greater than the threshold T, that is, user equipments are densely distributed in this region, the base station determines to switch to the non-precoded CSI-RS mechanism.

Next, in S1407, the base station informs the user equipments of this change through an RRC signaling, and reconfigures corresponding CSI-RS resource for the user equipments. As described above, the corresponding number of CSI-RS ports may be informed to the user equipment using, for example, the parameter antennaPortsCount in IE AntennaInfo.

In addition, in S1409, the base station transmits a signaling NP-portindicator (NP-portindicator=1) to indicate the user equipment how the resource is allocated. For example, the user equipment is indicated to parse Portcount2 ports in a descending order from port 22.

In S1411, the base station transmits non-precoded CSI-RSs to the user equipments.

In S1413, the user equipment parses and measures the allocated CSI-RS resource. In S1415, the user equipment feeds back the CSI in the CSI report format corresponding to the non-precoded CSI-RS mechanism (for exampling, including the PMI, the CQI and the RI).

It is obvious that the following method and procedure are also disclosed in the above description for the wireless communication device for base station side according to the embodiment of the present disclosure. Next, description for a wireless communication method for base station side according to an embodiment of the present disclosure is provided without repeating the details described above.

Figure 3:
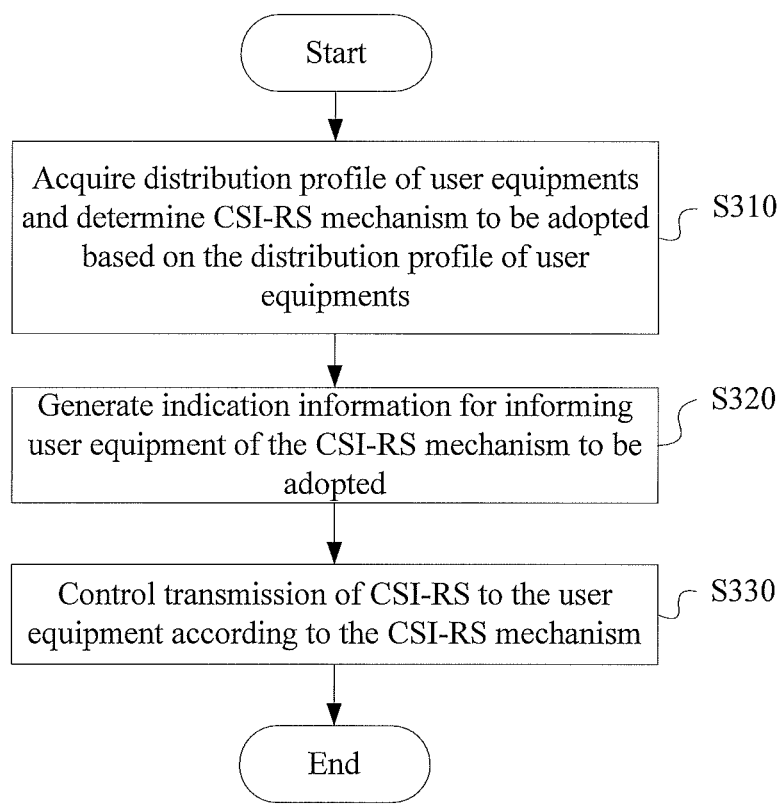
FIG. 3 is a flow chart illustrating a procedure example of a wireless communication method for base station side according to an embodiment of the present disclosure.

As shown in FIG. 3, according to an embodiment of the present disclosure, the wireless communication method for base station side includes the following steps.

In S310, a distribution profile of user equipments are acquired, and a Channel State Information Reference Signal CSI-RS mechanism to be adopted is determined based on the distribution profile of the user equipments.

Next, in S320, indication information is generated for informing a user equipment of the CSI-RS mechanism to be adopted.

Next, in S330, a CSI-RS is transmitted to the user equipment under control according to the determined CSI-RS mechanism.

Further, embodiments of the present disclosure also include wireless communication devices and wireless communication methods for user equipment side. Since some aspects of these embodiments correspond to the above device and method for base station side, detailed description of these aspects is omitted.

Figure 4:
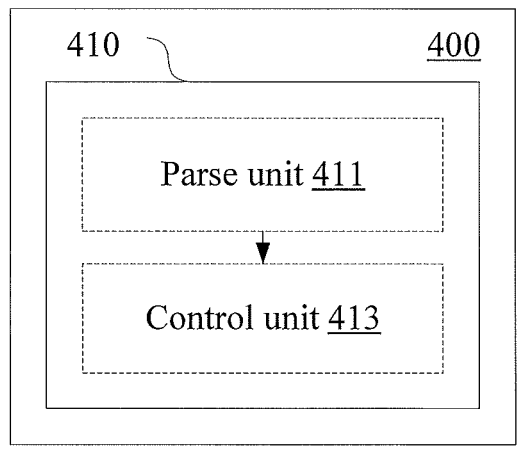
FIG. 4 is a block diagram illustrating a configuration example of a wireless communication device for user equipment side according to an embodiment of the present disclosure.

As shown in FIG. 4, a wireless communication device 400 for user equipment side according to an embodiment includes at least one processor 410, which includes a parse unit 411 and a control unit 413.

The parse unit 411 is configured to parse indication information from a base station. The indication information indicates a CSI-RS mechanism to be adopted.

The CSI-RS mechanism may be selected from a beamformed CSI-RS and a non-precoded CSI-RS. Specifically, the CSI-RS mechanism is determined by base station side based on a user density of a region where the user equipment is located.

The control unit 413 is configured to control a measurement of a CSI-RS from the base station according to the indicated CSI-RS mechanism. In addition, the control unit 413 is further configured to control a transmission of an uplink signal for proving directional information to the base station.

According to an embodiment, the control unit 413 may be further configured to control a transmission of a sounding reference signal (SRS) to the base station. The SRS contains directional information of the user equipment. The SRS may be used by the base station for determining distribution of user equipments in a predetermined region, thereby determining the CSI-RS mechanism to be adopted. For example, the control unit 413 may be configured to control periodic transmission of the SRS.

In addition, as described above, the base station may also acquire distribution of the user equipments based on the demodulation reference signals (DMRSs) transmitted by the user equipments. Alternatively, the base station may also first configure non-precoded CSI-RS resource for the user equipments, and acquire distribution of the user equipments based on the CSIs corresponding to the non-precoded CSI-RS resource fed back by the user equipments.

In addition, according to an embodiment, the control unit 413 may further be configured to control performance of generating a Channel State Information CSI report based on measurement for the CSI-RS from the base station according to the CSI-RS mechanism indicated by the base station.

For the beamformed CSI-RS, the generated CSI report may contain a channel quality indication. For the non-precoded CSI-RS, the generated CSI report may contain a channel quality indication, a rank indication and a precoding matrix indication.

Further, the control unit 413 may be configured to control a transmission of the generated CSI report to the base station. The CSI report of the configured CSI-RS resource may be transmitted according to the indicated CSI-RS mechanism.

In addition, the CSI-RS resource subset corresponding to the beamformed CSI-RS and the CSI-RS resource subset corresponding to the non-precoded CSI-RS may be orthogonal to each other, to reduce interference between different CSI-RS mechanisms.

Figure 5:
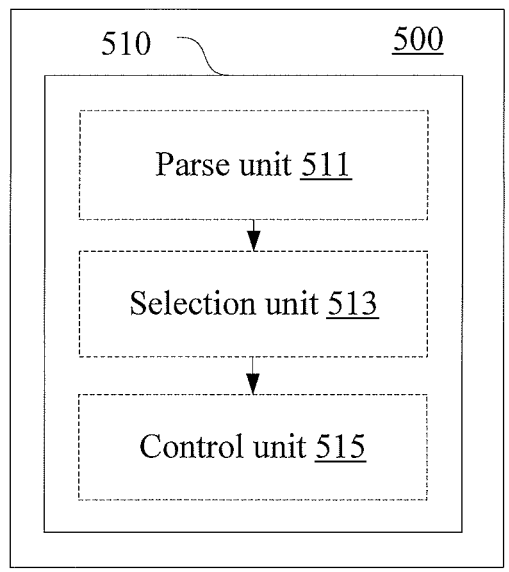
FIG. 5 is a block diagram illustrating a configuration example of a wireless communication device for user equipment side according to another embodiment.

FIG. 5 illustrates a configuration example of a wireless communication device for user equipment side according to another embodiment.

As shown in FIG. 5, a wireless communication device 500 for user equipment side according to this embodiment includes at least one processor 510, which includes a parse unit 511, a selection unit 513 and a control unit 515. The parse unit 511 and the control unit 515 are similar to the parse unit 411 and the control unit 413 described above with reference to FIG. 4, and are not described in detail herein.

The selection unit 513 is configured to select a port for transmitting the CSI report based on information from the base station indicating the number of ports of CSI-RS resource for a corresponding CSI-RS mechanism.

The selection unit 513 may select the port for transmitting the CSI port from a first group of ports starting from the minimum port number of the CSI-RS resource, or may select the port for transmitting the CSI report from a second group of ports starting from the maximum port number of the CSI-RS resource in response to a specific signaling (for example, the above signaling NP-portindicator) from the base station.

Figure 6:
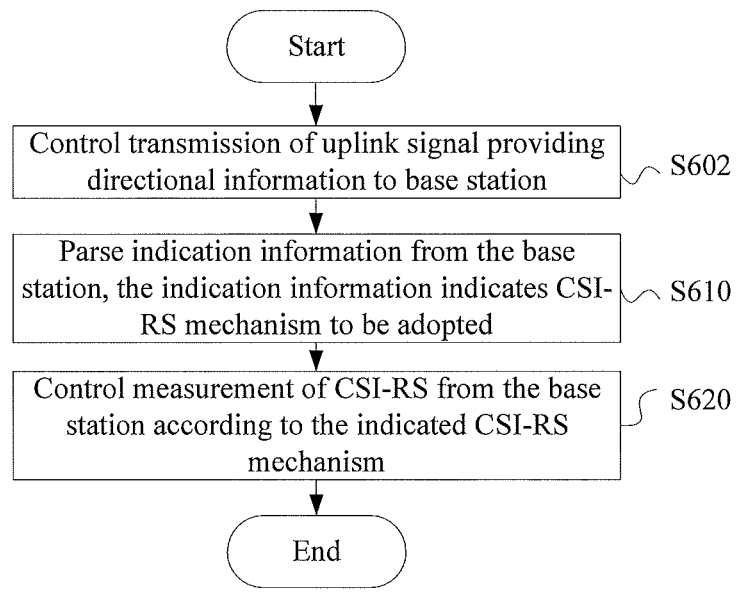
FIG. 6 is a flow chart illustrating a procedure example of a wireless communication method for user equipment side according to an embodiment of the present disclosure.

FIG. 6 illustrates a procedure example of a wireless communication method for user equipment side according to an embodiment of the present disclosure.

In S602, an uplink signal providing directional information is transmitted to a base station under control. The uplink signal includes, for example, SRS, and the directional information may include, for example, an angle of arrival.

In S610, indication information from the base station is parsed. The indication information indicates a Channel State Information Reference Signal CSI-RS mechanism to be adopted.

In S620, a CSI-RS from the base station is measured under control according to the indicated CSI-RS mechanism.

Figure 7:
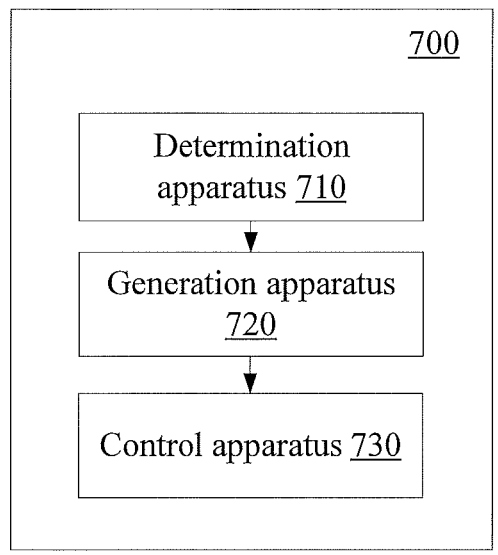
FIG. 7 is a block diagram illustrating a configuration example of a wireless communication device for base station side according to an embodiment of the present disclosure.
Figure 8:
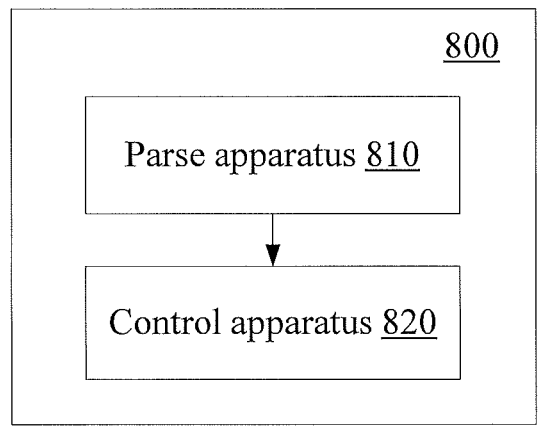
FIG. 8 is a block diagram illustrating a configuration example of a wireless communication device for user equipment side according to an embodiment of the present disclosure.

Further, the embodiments according to the present disclosure further includes a wireless communication device for base station side as shown in FIG. 7, and a wireless communication device for user equipment side as shown in FIG. 8.

As shown in FIG. 7, the wireless communication device 700 for base station side according to an embodiment includes a determination apparatus 710, a generation apparatus 720 and a control apparatus 730.

The determination apparatus 710 is configured to determine a Channel State Information Reference Signal CSI-RS mechanism to be adopted. The generation apparatus 720 is configured to generate indication information for informing a user equipment of the CSI-RS mechanism to be adopted. The control apparatus 730 is configured to control a transmission of a CSI-RS to the user equipment according to the CSI-RS mechanism.

As shown in FIG. 8, the wireless communication device 800 for user equipment side according to an embodiment includes a parse apparatus 810 and a control apparatus 820.

The parse apparatus 810 is configured to parse indication information from the base station. The indication information indicates a Channel State Information Reference Signal CSI-RS mechanism to be adopted. The control apparatus 820 is configured to control a measurement of a CSI-RS from the base station according to the indicated CSI-RS mechanism.

As an example, the steps of the above method and the constituting modules and/or units of the above device can be implemented in software, firmware, hardware, or a combination thereof. In the case where the present application is realized by software or firmware, a program constituting the software for implementing the above method is installed in a computer with a dedicated hardware structure (e.g. the general computer 900 shown in FIG. 9) from a storage medium or network, where the computer is capable of implementing various functions when installed with various programs.

Figure 9:
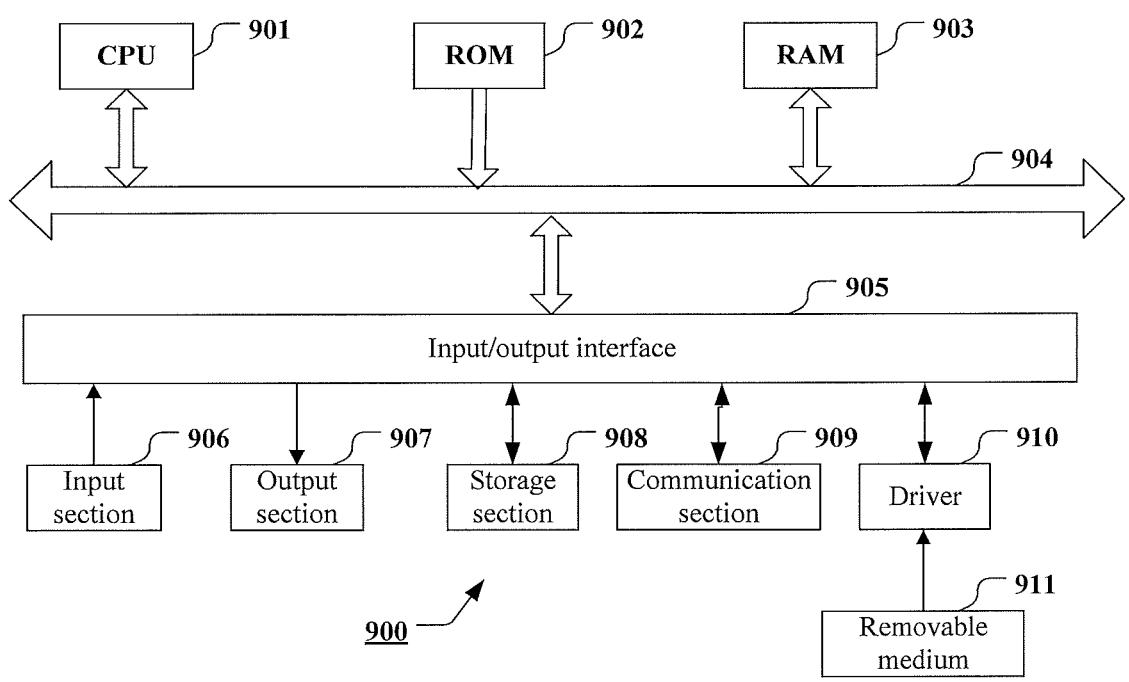
FIG. 9 is a block diagram illustrating an exemplary structure of a computer for implementing the method and the device according to the present disclosure.

In FIG. 9, a central processing unit (CPU) 901 executes various processing according to a program stored in a read-only memory (ROM) 902 or a program loaded to a random access memory (RAM) 903 from a storage section 908. The data needed for the various processing of the CPU 901 may be stored in the RAM 903 as needed. The CPU 901, the ROM 902 and the RAM 903 are linked with each other via a bus 904. An input/output interface 905 is also linked to the bus 904.

The following components are linked to the input/output interface 905: an input section 906 (including keyboard, mouse and the like), an output section 907 (including displays such as a cathode ray tube (CRT), a liquid crystal display (LCD), a loudspeaker and the like), a storage section 908 (including hard disc and the like), and a communication section 909 (including a network interface card such as a LAN card, modem and the like). The communication section 909 performs communication processing via a network such as the Internet. A driver 910 may also be linked to the input/output interface 905 as needed. If needed, a removable medium 911, for example, a magnetic disc, an optical disc, a magnetic optical disc, a semiconductor memory and the like, may be installed in the driver 910, so that the computer program read therefrom is installed in the storage section 908 as appropriate.

In the case where the foregoing series of processing is achieved by software, programs forming the software are installed from a network such as the Internet or a memory medium such as the removable medium 911.

It should be appreciated by those skilled in the art that the memory medium is not limited to the removable medium 911 shown in FIG. 9, which has program stored therein and is distributed separately from the apparatus so as to provide the programs to users. The removable medium 911 may be, for example, a magnetic disc (including floppy disc (registered trademark)), a compact disc (including compact disc read-only memory (CD-ROM) and digital versatile disc (DVD), a magneto optical disc (including mini disc (MD) (registered trademark)), and a semiconductor memory. Alternatively, the memory medium may be the hard discs included in ROM 902 and the storage section 908 in which programs are stored, and can be distributed to users along with the device in which they are incorporated.

The embodiments of the present disclosure further relate to a program product in which machine-readable instruction codes are stored. The aforementioned methods according to the embodiments can be implemented when the instruction codes are read and executed by a machine.

Accordingly, a memory medium for carrying the program product in which machine-readable instruction codes are stored is also covered in the present disclosure. The memory medium includes but is not limited to soft disc, optical disc, magnetic optical disc, memory card, memory stick and the like.

The embodiment of the present disclosure further relates to the following electronic devices. In a case where the electronic device is applied to base station side, the electronic device can be implemented as any type of evolved nodes B (eNB) such as a macro eNB and a small eNB. The small eNB may be an eNB such as a pico eNB, a micro eNB, and a home (femto) eNB that covers a cell smaller than a macro cell. Alternatively, the electronic device may be implemented as any other types of base stations such as a NodeB and a base transceiver station (BTS). The electronic device may include: a main body (that is also referred to as a base station apparatus) configured to control radio communication, and one or more remote radio heads (RRH) disposed in a different place from the main body. In addition, various types of terminals, which will be described below, may each operate as the base station by temporarily or semi-persistently executing a base station function.

In a case where the electronic device is applied to user equipment side, the electronic device may be implemented as a mobile terminal (such as a smart phone, a tablet personal computer (PC), a notebook PC, a portable game terminal, a portable/dongle type mobile router, and a digital camera), or an in-vehicle terminal (such as a car navigation apparatus). Furthermore, the electronic device may be a radio communication module (such as an integrated circuit module including a single die or multiple dies) mounted on each of the terminals described above.

[Application Example Regarding Terminal Device]

Figure 10:
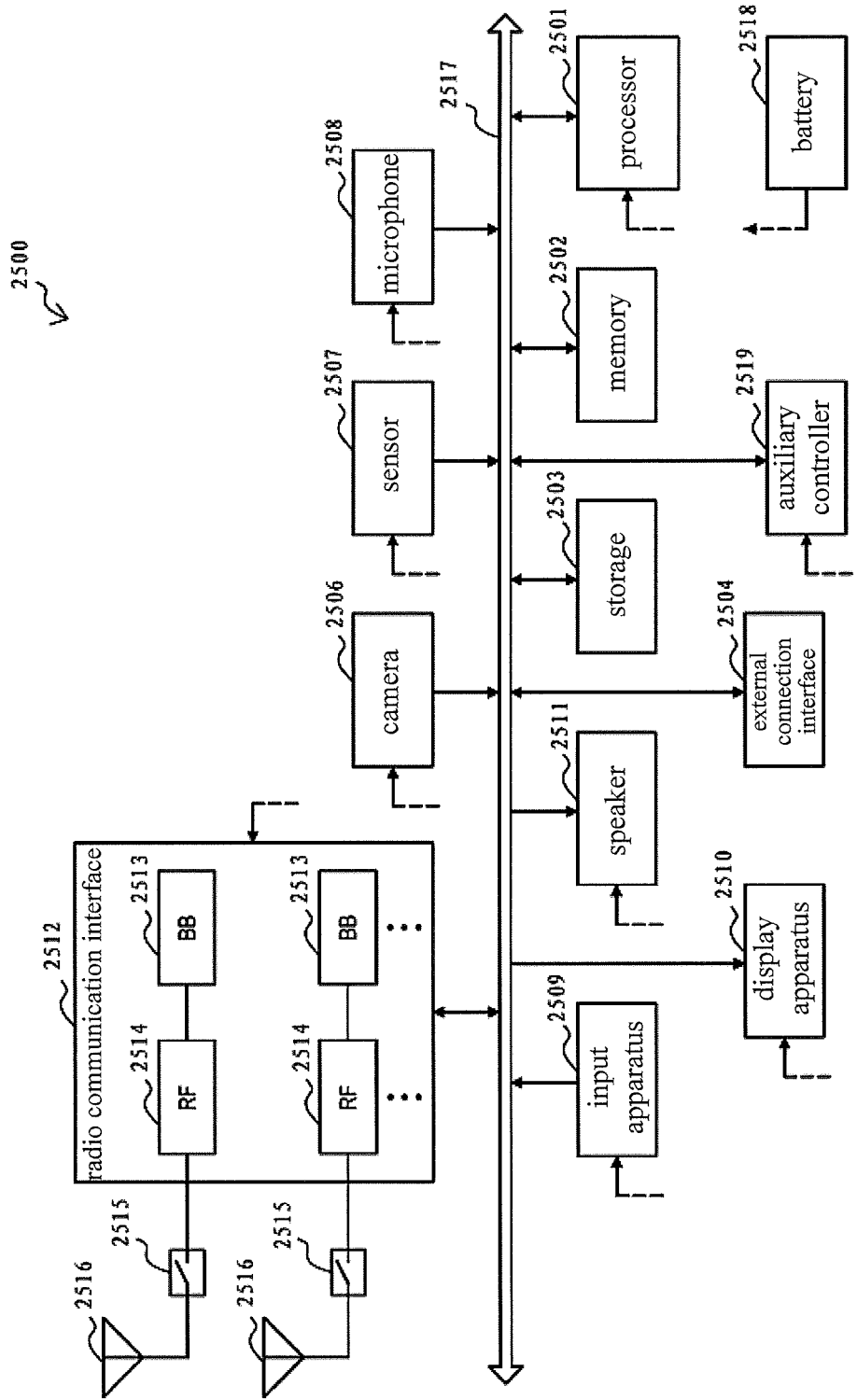
FIG. 10 is a block diagram illustrating an example of a schematic configuration of a smart phone to which the technology of the present disclosure may be applied.

FIG. 10 is a block diagram illustrating an example of a schematic configuration of a smartphone 2500 to which the technology of the present disclosure may be applied. The smartphone 2500 includes a processor 2501, a memory 2502, a storage 2503, an external connection interface 2504, a camera 2506, a sensor 2507, a microphone 2508, an input apparatus 2509, a display apparatus 2510, a speaker 2511, a radio communication interface 2512, one or more antenna switches 2515, one or more antennas 2516, a bus 2517, a battery 2518, and an auxiliary controller 2519.

The processor 2501 may be, for example, a CPU or a system on a chip (SoC), and controls functions of an application layer and another layer of the smartphone 2500. The memory 2502 includes RAM and ROM, and stores a program that is executed by the processor 2501, and data. The storage 2503 may include a storage medium such as a semiconductor memory and a hard disk. The external connection interface 2504 is an interface for connecting an external device such as a memory card and a universal serial bus (USB) device to the smartphone 2500.

The camera 2506 includes an image sensor such as a charge coupled device (CCD) and a complementary metal oxide semiconductor (CMOS), and generates a captured image. The sensor 2507 may include a group of sensors such as a measurement sensor, a gyro sensor, a geomagnetic sensor, and an acceleration sensor. The microphone 2508 converts sounds that are input to the smartphone 2500 to audio signals. The input apparatus 2509 includes, for example, a touch sensor configured to detect touch onto a screen of the display apparatus 2510, a keypad, a keyboard, a button, or a switch, and receives an operation or an information input from a user. The display apparatus 2510 includes a screen such as a liquid crystal display (LCD) and an organic light-emitting diode (OLED) display, and displays an output image of the smartphone 2500. The speaker 2511 converts audio signals that are output from the smartphone 2500 to sounds.

The radio communication interface 2512 supports any cellular communication scheme such as LET and LTE-Advanced, and performs radio communication. The radio communication interface 2512 may typically include, for example, a baseband (BB) processor 2513 and a radio frequency (RF) circuit 2514. The BB processor 2513 may perform, for example, encoding/decoding, modulating/demodulating, and multiplexing/demultiplexing, and performs various types of signal processing for radio communication. Meanwhile, the RF circuit 2514 may include, for example, a mixer, a filter, and an amplifier, and transmits and receives radio signals via the antenna 2516. The radio communication interface 2512 may be a one chip module having the BB processor 2513 and the RF circuit 2514 integrated thereon. The radio communication interface 2512 may include the multiple BB processors 2513 and the multiple RF circuits 2514, as illustrated in FIG. 10. Although FIG. 10 illustrates the example in which the radio communication interface 2512 includes the multiple BB processors 2513 and the multiple RF circuits 2514, the radio communication interface 2512 may also include a single BB processor 2513 or a single RF circuit 2514.

Furthermore, in addition to a cellular communication scheme, the radio communication interface 2512 may support another type of radio communication scheme such as a short-distance wireless communication scheme, a near field communication scheme, and a radio local area network (LAN) scheme. In that case, the radio communication interface 2512 may include the BB processor 2513 and the RF circuit 2514 for each radio communication scheme.

Each of the antenna switches 2515 switches connection destinations of the antennas 2516 among multiple circuits (such as circuits for different radio communication schemes) included in the radio communication interface 2512.

Each of the antennas 2516 includes a single or multiple antenna elements (such as multiple antenna elements included in an MIMO antenna), and is used for the radio communication interface 2512 to transmit and receive radio signals. The smartphone 2500 may include the multiple antennas 2516, as illustrated in FIG. 10. Although FIG. 13 illustrates the example in which the smartphone 2500 includes the multiple antennas 2516, the smartphone 2500 may also include a single antenna 2516.

Furthermore, the smartphone 2500 may include the antenna 2516 for each radio communication scheme. In that case, the antenna switches 2515 may be omitted from the configuration of the smartphone 2500.

The bus 2517 connects the processor 2501, the memory 2502, the storage 2503, the external connection interface 2504, the camera 2506, the sensor 2507, the microphone 2508, the input apparatus 2509, the display apparatus 2510, the speaker 2511, the radio communication interface 2512, and the auxiliary controller 2519 to each other. The battery 2518 supplies power to blocks of the smartphone 2500 illustrated in FIG. 13 via feeder lines, which are partially shown as dashed lines in the figure. The auxiliary controller 2519 operates a minimum necessary function of the smartphone 2500, for example, in a sleep mode.

In the smart phone 2500 shown in FIG. 10, at least part of the functions of units described with reference to FIG. 4 and FIG. 5 may be realized by the processor 2501 and the auxiliary controller 2519. For example, power consumption of the battery 2518 can be reduced by the auxiliary controller 2519 performing part of functions of the processor 2501. In addition, the processor 2501 or the auxiliary controller 2519 may perform at least part of functions of units described with reference to FIG. 4 and FIG. 5 by executing the program stored in the memory 2502 or the storage 2503.

[Application Example Regarding Base Station]

Figure 11:
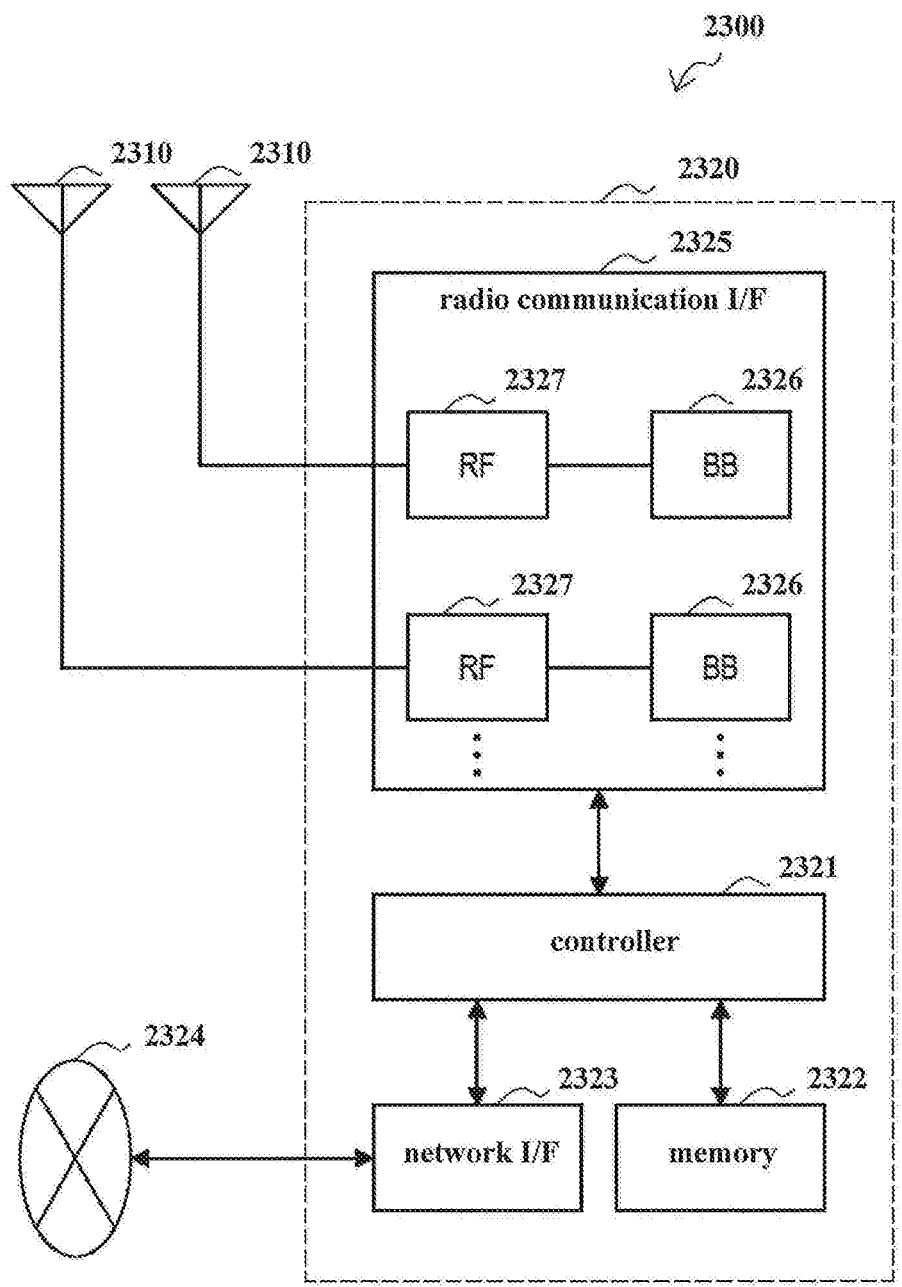
FIG. 11 is a block diagram illustrating an example of a schematic configuration of an eNB (evolved Node B) to which the technology of the present disclosure may be applied.

FIG. 11 is a block diagram illustrating an example of a schematic configuration of an eNB to which the technology of the present disclosure may be applied. An eNB 2300 includes one or more antennas 2310 and a base station apparatus 2320. Each antenna 2310 and the base station apparatus 2320 may be connected to each other via an RF cable.

Each of the antennas 2310 includes a single or multiple antenna elements (such as multiple antenna elements included in a multi-input multi-output (MIMO) antenna), and is used for the base station apparatus 2320 to transmit and receive radio signals. The eNB 2300 may include the multiple antennas 2310, as illustrated in FIG. 11. For example, the multiple antennas 2310 may be compatible with multiple frequency bands used by the eNB 2300. Although FIG. 11 illustrates the example in which the eNB 2300 includes the multiple antennas 2310, the eNB 2300 may also include a single antenna 2310.

The base station apparatus 2320 includes a controller 2321, a memory 2322, a network interface 2323, and a radio communication interface 2325.

The controller 2321 may be, for example, a CPU or a DSP, and operates various functions of a higher layer of the base station apparatus 2320. For example, the controller 2321 generates a data packet from data in signals processed by the radio communication interface 2325, and transfers the generated packet via the network interface 2323. The controller 2321 may bundle data from multiple base band processors to generate the bundled packet, and transfer the generated bundled packet. The controller 2321 may have logical functions of performing control such as radio resource control, radio bearer control, mobility management, admission control, and scheduling. The control may be performed in corporation with an eNB or a core network node in the vicinity. The memory 2322 includes RAM and ROM, and stores a program that is executed by the controller 2321, and various types of control data (such as a terminal list, transmission power data, and scheduling data).

The network interface 2323 is a communication interface for connecting the base station apparatus 2320 to a core network 2324. The controller 2321 may communicate with a core network node or another eNB via the network interface 2323. In that case, the eNB 2300, and the core network node or the other eNB may be connected to each other through a logical interface (such as an S1 interface and an X2 interface). The network interface 2323 may also be a wired communication interface or a radio communication interface for radio backhaul. If the network interface 2323 is a radio communication interface, the network interface 2323 may use a higher frequency band for radio communication than a frequency band used by the radio communication interface 2325.

The radio communication interface 2325 supports any cellular communication scheme such as Long Term Evolution (LTE) and LTE-Advanced, and provides radio connection to a terminal positioned in a cell of the eNB 2300 via the antenna 2310. The radio communication interface 2325 may typically include, for example, a BB processor 2326 and an RF circuit 2327. The BB processor 2326 may perform, for example, encoding/decoding, modulating/demodulating, and multiplexing/demultiplexing, and performs various types of signal processing of layers (such as L1, medium access control (MAC), radio link control (RLC), and a packet data convergence protocol (PDCP)). The BB processor 2326 may have a part or all of the above-described logical functions instead of the controller 2321. The BB processor 2326 may be a memory that stores a communication control program, or a module that includes a processor and a related circuit configured to execute the program. Updating the program may allow the functions of the BB processor 2326 to be changed. The module may be a card or a blade that is inserted into a slot of the base station apparatus 2320. Alternatively, the module may also be a chip that is mounted on the card or the blade. Meanwhile, the RF circuit 2327 may include, for example, a mixer, a filter, and an amplifier, and transmits and receives radio signals via the antenna 2310.

As shown in FIG. 11, the radio communication interface 2325 may include the multiple BB processors 2326. For example, the multiple BB processors 2326 may be compatible with multiple frequency bands used by the eNB 2300. The radio communication interface 2325 may include the multiple RF circuits 2327, as illustrated in FIG. 11. For example, the multiple RF circuits 2327 may be compatible with multiple antenna elements. Although FIG. 11 illustrates the example in which the radio communication interface 2325 includes the multiple BB processors 2326 and the multiple RF circuits 2327, the radio communication interface 2325 may also include a single BB processor 2326 or a single RF circuit 2327.

In the eNB 2300 shown in FIG. 11, at least part of the functions of units described with reference to FIG. 1 and FIG. 2 may be implemented by the controller 2321. For example, the controller 2321 may perform at least part of the functions of units described with reference to FIG. 1 and FIG. 2 by executing the program stored in the memory 2322.

In the above description of embodiments of the present disclosure, a feature described and/or illustrated in an embodiment may be applied to one or more other embodiments in a same or similar manner, or may be combined with a feature in other embodiments, or may replace a feature in other embodiments.

It should be emphasized that, the term "include/contain", as used in the present disclosure, means existence of a feature, an element, a step or a component, but does not exclude existence or addition of one or more other features, elements, steps or components.

In the above examples and embodiments, numeric reference characters are used for representing various steps and/or units. Those skilled in the art should understand that the reference characters are only used for facilitating description and illustration rather than representing an order or other limits.

Furthermore, the methods in the present disclosure are not limited to be performed in the time order as described, but may be performed in other time orders or in parallel or independently. Therefore, the performing order of the method described in the present disclosure is not a limit to the technical scope of the present disclosure.

Although the disclosure is disclosed by describing specific embodiments of the present disclosure, it should be noted that each of the above examples and embodiments is not for limiting but for illustrating. Those skilled in the art may design various modifications, improvements and equivalents of the present disclosure within the spirit and scope of the appended claims. The modifications, improvements and equivalents should also be construed as being included in the scope of the present disclosure.

The invention claimed is:

1. A wireless communication device for base station side, comprising:
   at least one processor configured to
   acquire a distribution profile of user equipments, wherein the distribution profile indicates a user density;
   determine, based on the distribution profile of the user equipments, a Channel State Information Reference Signal CSI-RS mechanism to be adopted, wherein determining the CSI-RS mechanism comprises selecting one of a beamformed CSI-RS and a non-precoded CSI-RS, wherein the non-precoded CSI-RS is selected in a case where the user density is higher than a predetermined level, and the beamformed CSI-RS is selected in a case where the user density is lower than the predetermined level, and wherein the predetermined level is related to a spatial resolution of the beamformed CSI-RS;
   generate indication information for informing a user equipment of the CSI-RS mechanism to be adopted; and
   control, according to the CSI-RS mechanism, a transmission of a CSI-RS to the user equipment.

2. The wireless communication device according to claim 1, wherein acquiring the distribution profile of the user equipments comprises: estimating the distribution profile of the user equipments based on directional information acquired from uplink signals of the user equipments.

3. The wireless communication device according to claim 2, wherein the uplink signal comprises a sounding reference signal, and the directional information comprises an angle of arrival of the sounding reference signal.

4. The wireless communication device according to claim 1, wherein the processor is further configured to:
   control a reception and/or a parse of a Channel State Information CSI report from the user equipment, wherein for the beamformed CSI-RS, the CSI report contains a channel quality indication, and does not contain a rank indication and a precoding matrix indication, and for the non-precoded CSI-RS, the CSI report contains at least one of the channel quality indication, the rank indication and the precoding matrix indication.

5. The wireless communication device according to claim 1, wherein the processor is further configured to embed the indication information in a Radio Resource Control signaling.

6. The wireless communication device according to claim 1, wherein the processor is further configured to:
set, respectively for the beamformed CSI-RS and the non-precoded CSI-RS, corresponding CSI-RS resource subsets.

7. The wireless communication device according to claim 6, wherein setting the corresponding CSI-RS resource subsets comprises:
setting the CSI-RS resource subset for the beamformed CSI-RS and the CSI-RS resource subset set for the non-precoded CSI-RS to be orthogonal to each other.

8. The wireless communication device according to claim 1, wherein the processor is further configured to:
generate information for informing a user equipment of the number of ports for a corresponding CSI-RS mechanism.

9. A wireless communication device for user equipment side, comprising:
at least one processor configured to
control a transmission of an uplink signal providing directional information to a base station;
parse indication information from the base station, wherein the indication information indicates a Channel State Information Reference Signal CSI-RS mechanism to be adopted, wherein the CSI-RS mechanism is selected from a beamformed CSI-RS and a non-precoded CSI-RS;
control a measurement of a CSI-RS from the base station according to the indicated CSI-RS mechanism;
generate a Channel State Information CSI report based on a measurement for the CSI-RS from the base station according to the indicated CSI-RS mechanism, wherein for the beam formed CSI-RS, the CSI report contains a channel quality indication, and does not contain a rank indication and a precoding matrix indication; and
control a transmission of the CSI report to the base station, wherein CSI of a corresponding CSI-RS resource subset is reported according to the indicated CSI-RS mechanism.

10. The wireless communication device according to claim 9, wherein the uplink signal comprises a sounding reference signal.

11. A wireless communication device for base station side, comprising:
at least one processor configured to
acquire a distribution profile of user equipments, wherein acquiring the distribution profile of the user equipments comprises: estimating the distribution profile of the user equipments based on directional information acquired from uplink signals of the user equipments;
determine, based on the distribution profile of the user equipments, a Channel State Information Reference Signal CSI-RS mechanism to be adopted, wherein determining the CSI-RS mechanism comprises selecting one of a beamformed CSI-RS and a non-precoded CSI-RS, wherein the selecting comprises: selecting the CSI-RS mechanism respectively for each of sub-regions of a cell of the base station based on the distribution profile of user equipments in the sub-region;
generate indication information for informing a user equipment of the CSI-RS mechanism to be adopted; and
control, according to the CSI-RS mechanism, a transmission of a CSI-RS to the user equipment.

12. The wireless communication device according to claim 11, wherein the distribution profile indicates a user density, the selecting comprises:
the non-precoded CSI-RS is selected in a case where the user density is higher than a predetermined level, and the beamformed CSI-RS is selected in a case where the user density is lower than the predetermined level.

13. The wireless communication device according to claim 12, wherein the predetermined level is related to a spatial resolution of the beamformed CSI-RS.

14. A wireless communication device for base station side, comprising:
at least one processor configured to
acquire a distribution profile of user equipments;
determine, based on the distribution profile of the user equipments, a Channel State Information Reference Signal CSI-RS mechanism to be adopted, wherein determining the CSI-RS mechanism comprises selecting one of a beamformed CSI-RS and a non-precoded CSI-RS;
generate indication information for informing a user equipment of the CSI-RS mechanism to be adopted;
control, according to the CSI-RS mechanism, a transmission of a CSI-RS to the user equipment; and
control a reception and/or a parse of a Channel State Information CSI report from the user equipment, wherein for the beamformed CSI-RS, the CSI report contains a channel quality indication, and does not contain a rank indication and a precoding matrix indication, and for the non-precoded CSI-RS, the CSI report contains at least one of the channel quality indication, the rank indication and the precoding matrix indication.

* * * * *